United States Patent [19]
Khosla

[11] Patent Number: 5,884,277
[45] Date of Patent: Mar. 16, 1999

[54] PROCESS FOR ISSUING COUPONS FOR GOODS OR SERVICES TO PURCHASERS AT NON-SECURE TERMINALS

[75] Inventor: Vinod Khosla, Portola Valley, Calif.

[73] Assignee: Vinod Khosla, Portola Valley, Calif.

[21] Appl. No.: 431,831

[22] Filed: May 1, 1995

[51] Int. Cl.⁶ .................................................. G06F 17/60
[52] U.S. Cl. ................................. 705/14; 380/23; 380/25; 380/51; 380/55
[58] Field of Search ................................... 395/205, 206, 395/214; 235/375, 379, 380, 381, 383; 364/400; 380/23, 24, 25, 51, 55; 705/5, 6, 14, 26, 27

[56] References Cited

U.S. PATENT DOCUMENTS

| | | |
|---|---|---|
| 3,890,599 | 6/1975 | Simjian . |
| 3,990,558 | 11/1976 | Ehrat . |
| 4,686,527 | 8/1987 | Goldman . |
| 4,748,668 | 5/1988 | Shamir et al. . |
| 4,775,246 | 10/1988 | Edelmann et al. . |
| 4,788,643 | 11/1988 | Trippe et al. ........................ 364/407 |
| 4,816,655 | 3/1989 | Musyck et al. . |
| 4,916,738 | 4/1990 | Chandra et al. . |
| 4,977,595 | 12/1990 | Ohta et al. . |
| 5,022,080 | 6/1991 | Durst et al. . |
| 5,191,523 | 3/1993 | Whitesage ........................... 364/407 |
| 5,214,700 | 5/1993 | Pinkas et al. . |
| 5,237,499 | 8/1993 | Garback ............................... 364/407 |
| 5,239,480 | 8/1993 | Huegel .................................. 364/479 |
| 5,245,657 | 9/1993 | Sakurai . |
| 5,247,578 | 9/1993 | Pailles et al. . |
| 5,249,044 | 9/1993 | Von Kohorn ......................... 395/214 |
| 5,253,166 | 10/1993 | Dettelbach et al. .................. 364/407 |
| 5,317,637 | 5/1994 | Pichlmaier et al. . |
| 5,404,291 | 4/1995 | Kerr et al. ............................ 364/407 |
| 5,557,518 | 9/1996 | Rosen .................................... 380/24 |
| 5,621,797 | 4/1997 | Rosen .................................... 380/24 |
| 5,642,419 | 6/1997 | Rosen .................................... 380/23 |

(List continued on next page.)

FOREIGN PATENT DOCUMENTS

| | | |
|---|---|---|
| 1121014 | 3/1982 | Canada . |
| 2032224 | 4/1980 | United Kingdom . |
| 2102606 | 2/1983 | United Kingdom . |

OTHER PUBLICATIONS

D. Chaum et al., "Group Signatures", *Advances in Cryptology–Eurocrypt '91*, pp. 257–265, Workshop on the Theory and Application of Cryptographic Techniques, Brighton, UK, Apr. 8–11, 1991.

U. Feige, et al., "Witness Indistinguishable And Witness Hiding Protocols", *Proceedings of the Twenty Second Annual ACM Symposium on Theory of Computing*, pp. 416–426, Baltimore, Maryland, May 14–16, 1990.

*Primary Examiner*—Edward R. Cosimano
*Attorney, Agent, or Firm*—Mark A. Haynes; Wilson, Sonsini, Goodrich & Rosati

[57] ABSTRACT

A method for automated issuance of a coupon redeemable for goods or services purchased in a transaction involving a purchaser at a non-secure terminal on a public network is provided. The method includes receiving purchaser login data from the public network at a processing system, where the login data positively identifies the purchaser. The system provides through the public network to the identified purchaser a gateway to tools for selecting goods or services for purchase. The purchaser selects goods or services using these tools and provides payment information through the public network for the selected goods or services. The processing system verifies payment for goods or services. Next, the processing system generates coupon data, such as a clear text transcript of the transaction, and an encrypted transcript of the transaction. The coupon data is sent to the purchaser across the public network, enabling the purchaser to a coupon at a non-secure terminal. The coupon may be redeemed for the selected goods or services at a later date. The invention may be applied to the issuance of airline tickets, redeemable for travel. Coupon verification may be provided at the point of travel, where computer systems may be connected directly to a verification function.

30 Claims, 3 Drawing Sheets

U.S. PATENT DOCUMENTS

| | | | |
|---|---|---|---|
| 5,671,279 | 9/1997 | Elgamal | 380/23 |
| 5,671,280 | 9/1997 | Rosen | 380/24 |
| 5,677,955 | 10/1997 | Doggett et al. | 380/24 |
| 5,703,949 | 12/1997 | Rosen | 380/21 |
| 5,721,832 | 2/1998 | Westrope et al. | 705/27 |
| 5,761,648 | 6/1998 | Golden et al. | 705/14 |

5,884,277

PROCESS FOR ISSUING COUPONS FOR GOODS OR SERVICES TO PURCHASERS AT NON-SECURE TERMINALS

BACKGROUND OF THE INVENTION

1. Field of the Invention

The present invention relates to on-line transactions, and more particularly to on-line transactions by which a purchaser at a non-secure terminal is able to purchase goods or services, such as airline tickets, and receive coupon data for the selected goods or services which can be printed at the non-secure terminal.

2. Description of Related Art

The number of users connected to public networks is expanding rapidly. Many systems have arisen which provide users connected to such networks a wide variety of services. For instance, users are able to select goods for purchase, pay for the goods using a credit card or other payment service, using automated systems on the network, and later, the goods or services are delivered to their homes.

One limitation of these on-line systems has been the inability to allow purchasers at non-secure terminals to print coupons which they have purchased on-line. Thus, airline reservation systems which are available on-line allow the user to make a confirmed reservation. However, the user must go through a travel agent or other authorized, secure service to receive the actual ticket.

The generation of secure documents at remote terminals has been addressed in a variety of contexts, including postage meter systems and the like. These prior art systems allow purchasers to print a coupon for postage or other goods or services at their homes or offices. However, special secure equipment at the purchaser's site is required.

Prior art concerning the printing of secure documents using secure terminals is described in the U.S. Pat. No. 3,890,599 by Simjian; and U.S. Pat. No. 4,775,246 by Edelmann, et al., both of which rely on a secure metering device.

In addition, there is a great deal of work concerning secure banking transactions and the like that can be executed on-line. See for instance, U.S. Pat. No. 3,990,558 by Ehrat. Further, credit card and check verification processes using encryption techniques have been described. See for instance, U.S. Pat. No. 4,816,655 by Musyck, et al.; U.S. Pat. No. 4,686,527 by Goldman. Encryption technology which is available for providing security for on-line transactions is described in a number of references. See for instance, U.S. Pat. No. 5,214,700 by Pinkas, et al.; U.S. Pat. No. 5,317,637 by Pichlmaier, et al.; and U.S. Pat. No. 5,245,657 by Sakurai.

Notwithstanding substantial work in the field of on-line services and secure transactions, no prior art system has made available to a purchaser the ability to print coupons for purchased goods or services at a non-secure terminal, where the coupons have been purchased through an on-line transaction.

SUMMARY OF THE INVENTION

The present invention provides a method for automated issuance of coupon data redeemable for goods or services purchased in a transaction involving a purchaser at a non-secure terminal on a public network.

The invention can be characterized as a data processing method which begins by receiving purchaser login data from the public network in a processing system, where the login data positively identifies the purchaser. The system provides through the public network to the identified purchaser a gateway to tools for selecting goods or services for purchase. The purchaser selects goods or services using these tools and provides payment information through the public network for the selected goods or services. The processing system verifies payment for the goods or services. Next, the processing system generates coupon data, such as a combination of a clear text transcript of the transaction and an encrypted transcript of the transaction. The coupon data is sent to the purchaser across the public network, enabling the purchaser to print the coupon at a non-secure terminal. The coupon data may be printed on plain paper, and for additional security, the coupon may be printed on special paper which cannot be easily copied, referred to as secure stock. In another alterative, the coupon data may be stored in a magnetic strip, like on a user's credit card, or other machine readable form to facilitate its use at the point of redemption. The coupon may be redeemed for the selected goods or services at a later date.

The coupon data may include sufficient information to prevent fraud by either coupon holders or the providers of the goods or services. Clear text and encrypted transcripts are one way to do this. The clear text transcript of the transaction will include identification of the purchaser, payment verification, and identification of the goods or services selected. The transcript may also include the time of the transaction and other characteristics of the transaction. The encrypted transcript will include, according to one aspect, data indicating the identified purchaser, the selected goods or services, and verification of payment.

Verification services may be provided to providers of the goods or services by which valid coupons are verified. The verification process will involve entering the encrypted transcript in a machine to decipher it. The decrypted transcript is then compared to the clear text transcript. If they match in critical ways, then the coupons are honored. Further, users of the system may be assigned personal identification (PIN) numbers, which are used at the point of redemption to verify the identity of the coupon purchaser.

Also, arbiter services may be provided to purchasers by which valid coupons are verified. If a dispute arises about a particular coupon which was not honored, then a purchaser may have an arbiter decrypt the encrypted transcript. If a match is detected, then the purchaser is vindicated. However, because of the encryption technology used for the encrypted transcript, fraudulent issuers should be deterred.

According to another aspect of the invention, it may be applied to the issuance of airline tickets, redeemable for travel in a transaction involving a purchaser at a non-secure terminal. According to this aspect, the process proceeds as outlined above. The coupon verification may be provided at the point of travel, where computer systems may be connected directly to a verification function.

According to yet another aspect of the invention, the method is applied to a system for issuance of an airline ticket or other coupon by means of a public on-line service. According to this aspect, a public on-line service receives purchaser login data from the public network. Next, the on-line system opens a gateway for the purchaser to an airline reservation system, or other catalog, providing through the public network tools for making reservations for purchase. The on-line system receives reservation confirmation data from the airline reservation system (or the catalog system) and signals the purchaser of the confirmed reservation. The on-line system then receives payment information through the public network from the purchaser of the confirmed reservation. It then verifies payment and retrieves a confirmation code from the provider of the goods or services. Next, a clear text transcript of the transaction is generated. Also, an encrypted transcript of the transaction is generated. The clear text and the encrypted transcripts are sent through the public network to the purchaser, so that the purchaser may print a coupon to be honored at the point of travel (or sale).

Accordingly, the present invention greatly improves the availability of services provided through public networks, particularly the availability of airline reservation systems by eliminating the need for third party travel agents and the like. By allowing a purchaser at a non-secure terminal to print a coupon which can be redeemed for air travel, the process of obtaining airline tickets on-line is vastly simplified.

Other aspects and advantages of the present invention can be seen upon review of the figures, the detailed description, and the claims which follow.

DETAILED DESCRIPTION OF PREFERRED EMBODIMENTS

A detailed description of embodiments of the present invention is provided with reference to the figures.

Figure 1:
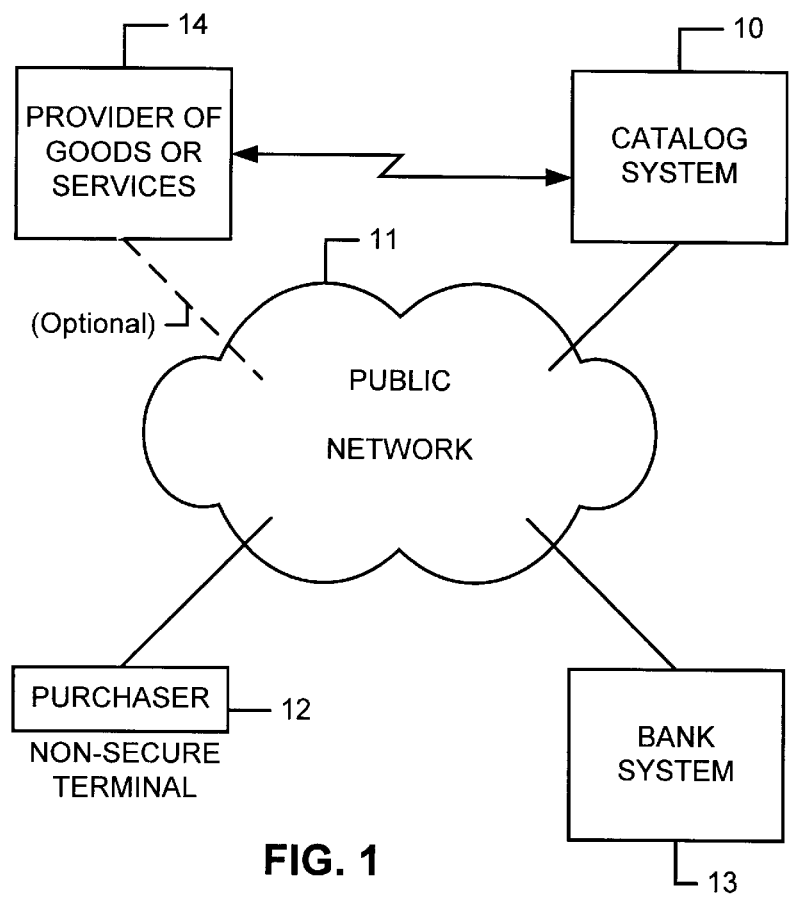
FIG. 1 is a schematic diagram of a public network illustrating a non-secure terminal used by purchaser, and a catalog system on the public network according to the present invention.

FIG. 1 illustrates the basic system in which the present invention is implemented. In particular, a catalog system 10 is coupled to a public network 11. Also, a purchaser 12 using a non-secure terminal is coupled to the network 11. Finally, a bank system 13 is coupled to the public network 11, by which the purchaser may make payments to the catalog system 10. A provider 14 of goods or services is coupled to the catalog system 10, or to the public network so that confirmation of the transaction may be positively made.

Figure 2:
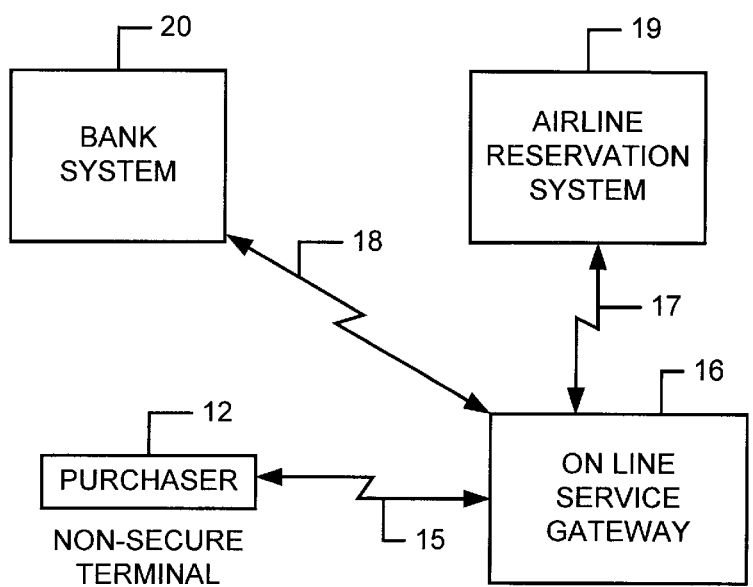
FIG. 2 is a schematic diagram of an airline reservation system based on allowing the purchaser at a non-secure terminal to print coupons according to the present invention.

An alternative configuration for a system executing the present invention is illustrated in FIG. 2. In FIG. 2, a purchaser 12 is coupled by a switched network link 15, such as a telephone line, to an on-line service gateway 16. The on-line service gateway 16 is connected through switched links 17 and 18 to an airline reservation system 19 and a bank system 20, respectively. Examples of on-line service gateways include Compuserve, America Online, Prodigy, and numerous systems on the Internet.

Figure 3:
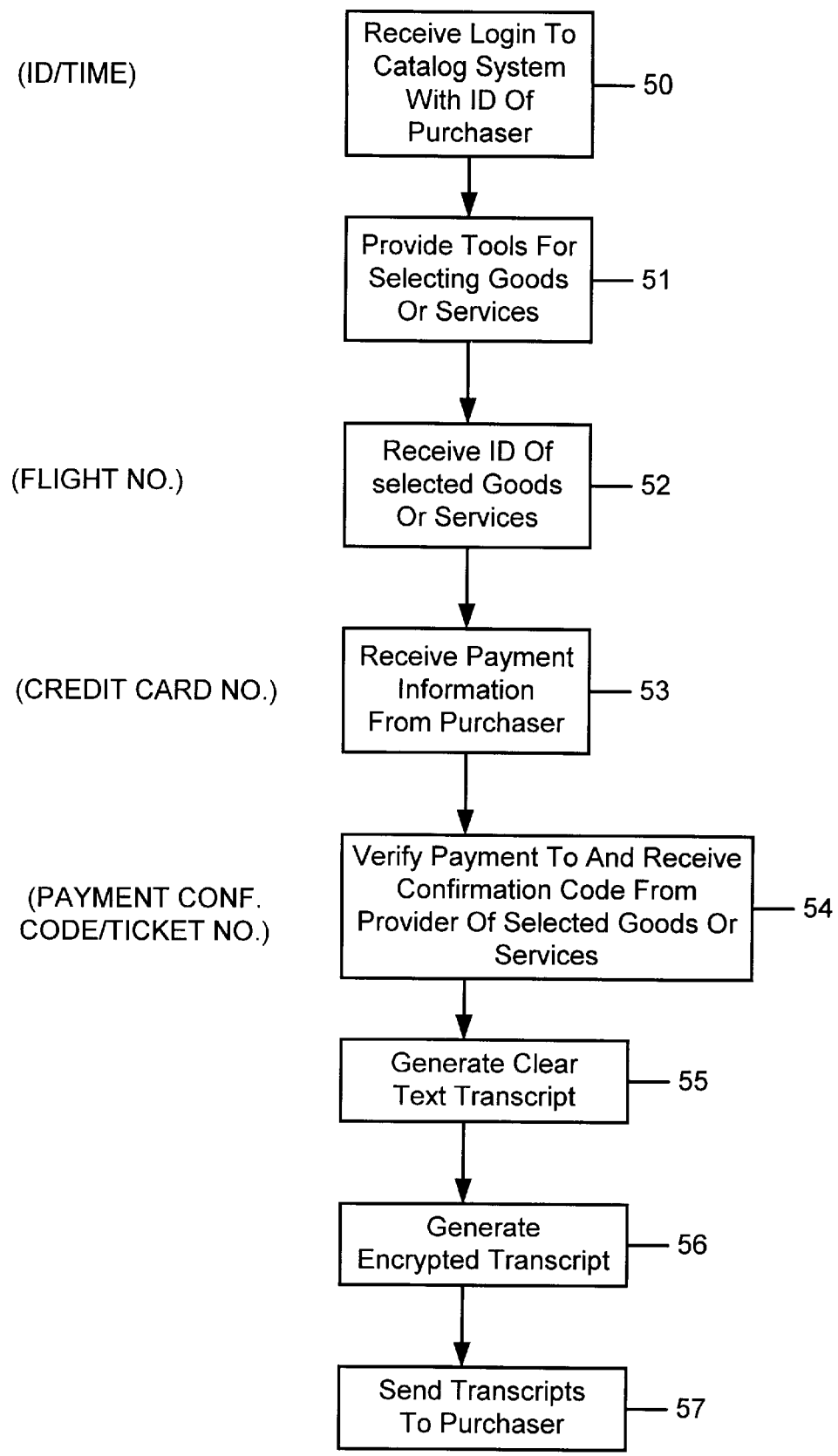
FIG. 3 is a flow chart illustrating the processing at the host system for issuing coupons to purchasers at non-secure terminals according to the present invention.

The catalog system 10 of FIG. 1 executes the steps illustrated in FIG. 3 to allow the purchaser 12 to print a coupon for purchased goods or services. Thus, the catalog system 10 receives a login to the catalog system with an identification of the purchaser (block 50). Next, the catalog system provides tools for selecting goods or services to the purchaser through the network (block 51). After the purchaser makes a selection, the catalog system receives an identification of the selected goods or services from the purchaser (block 52). In the next step, the catalog system receives payment information from the purchaser (block 53). In response to the payment information, such as a bank card number, the catalog system communicates with the bank and the provider to verify payment, and receives a confirmation from the provider of the selected goods or services (block 54). Next, a clear text transcript of the transaction is generated (block 55). This transcript may include the user identification and time of the login, such as generated at step 50, a flight number, for instance, for purchase of an airline ticket, as generated at step 52, a credit card number, such as received at step 53, and a payment confirmation code and a ticket number, such as generated at step 54.

Next, an encrypted transcript is generated (block 56). The encrypted transcript may include all or a subset of data included in the clear text transcript. This process may include associating a PIN number with the transaction. Finally, the transcripts are sent to the purchaser through the public network, where the purchaser may print a coupon to be redeemed at a later date (block 57).

Figure 4:
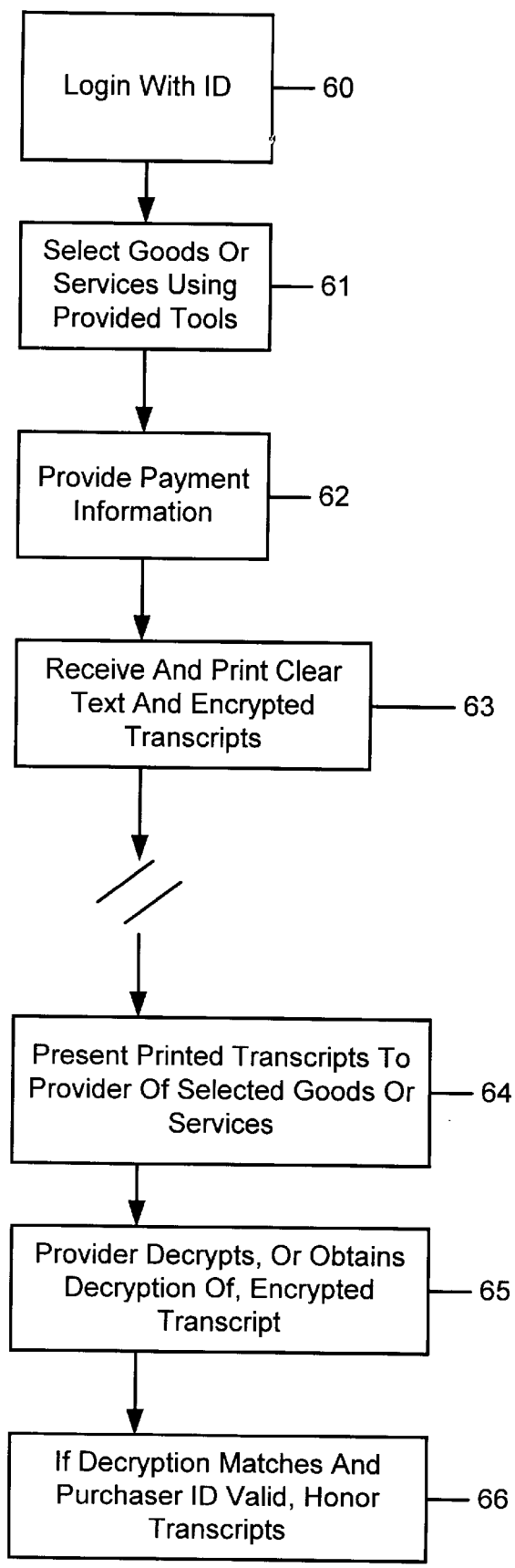
FIG. 4 is a flow chart of processing at the non-secure terminal for printing a coupon redeemable for goods or services purchased through the network according to the present invention.

The processing by the purchaser is illustrated in FIG. 4. The purchaser executes a login sequence to login to the catalog system 10 (block 60). Next, the purchaser selects goods or services using the provided tools (block 61). Next, in response to prompts from the catalog system, the user provides payment information, such as a credit card number or the like (block 62). After providing the payment information, the purchaser receives and prints a coupon including the coupon data comprising the clear text and encrypted transcripts of the transaction (block 63). At a later time, as indicated by the break in line 67, the purchaser presents the coupon data to a provider of selected goods or services (block 64). The coupon data may be on plain paper, secure paper, or stored in a machine readable form, such as a magnetic strip on a card.

The provider decrypts or obtains a decryption of the encrypted transcript (block 65). This process may involve verifying the PIN number associated with the transaction. If the decryption matches and the purchaser identification is valid, then the transcripts are honored by the provider (block 66).

With reference to FIG. 2, certain modifications in the process of the FIG. 3 might be implemented. In particular, the process of FIG. 3 is executed at the on-line service gateway 16. The act of providing tools for selected goods or services involves providing a gateway across the link 17 to the airline reservation system 19. The airline reservation system 19 in turn provides tools by which the purchaser is allowed to select a reservation for purchase. A confirmed reservation is then received by the on-line service gateway and provided to the purchaser 12. After receiving the confirmed reservation, the purchaser provides payment information to the on-line service gateway 16. The on-line service gateway 16 then verifies payment by communication across link 18 to the bank system 20, causing a transfer of funds from the bank system to the corresponding bank of the airline reservation system. When payment is confirmed by the airline reservation system, the on-line service gateway receives a confirmation code from the airline reservation system and/or the bank system.

The encryption technology used to generate the encrypted transcript and to decrypt the encrypted transcript may include the so-called data encryption standard DES now in widespread use or other encryption techniques. The DES system ensures that a third party arbiter may intervene in the case of disputes, such as accusations by purchasers of fraud.

The decryption services used by the providers of goods or services who must honor the coupons, and by purchasers who want verification of the validity of their coupons, may be provided directly by the catalog system 10 in the system of FIG. 1, or through the on-line service gateway 16. These services could be coupled directly to the point of sale at which the coupons are redeemed, or be made available through the public network as suits the needs of the particular implementation. Also, the on-line service gateway 16 may include resources for providing the decryption services to purchasers and providers.

The process according to the present invention ensures that the coupon printing system will be free of accusations of fraud. An unauthorized party cannot issue coupons for a catalog system because it will not have access to the encryption technology, and cannot generate correctly encrypted transcripts. Purchasers can avoid using unauthorized services by acquiring positive identification of the catalog system being used, or by relying on an on-line service gateway 16 which has secure connections to authorized catalog providers. Also, the providers of the goods or services can be ensured that no fraudulent coupons are redeemed by merely checking the encrypted transcript for matches with the clear text transcript. The encrypted transcript includes a confirmation code from the provider itself so that the provider will not mistakenly honor invalid coupons.

This system is further secure from theft of transmitted clear text transcripts and encrypted transcripts because the encrypted transcript will include an identification of the purchaser as well as the goods or services. A third party who steals a coupon will not be able to redeem the coupon without also having fraudulent personal identification. A variety of techniques can be used to make sure that the personal identification technique at the point of sale is secure.

Accordingly, a secure and efficient system for issuing coupons redeemable for goods or services across the public network to purchasers at non-secure terminals has been provided. This vastly expands the capability of the public network to deliver goods and services to users of the network. This will enable a catalog service where the user can take the printed coupon and pick up purchased goods or use purchased services at a later time, rather than relying upon the catalog service provider to ship the goods to the user. This is particularly important in travel reservation systems, such as for airline ticket purchases.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for automated issuance by a data processing system of redeemable data in a transaction involving a purchaser at a non-secure terminal on a public network, comprising:

receiving purchaser login data from the public network at a processing system, the login data identifying the purchaser;

providing through the public network to the identified purchaser at the non-secure terminal a gateway in the processing system to tools for selecting goods or services for purchase;

receiving payment information through the public network, from the purchaser for selected goods or services;

verifying payment; and generating and sending to the purchaser at the non-secure terminal redeemable data through the public network including information sufficient to be redeemed for goods or services, wherein said generating includes encrypting at least a portion of said redeemable data.

2. The method of claim 1, including:

providing verification services to providers of the goods or services by which valid coupon data is verified.

3. The method of claim 1, including:

providing arbiter services to purchasers by which valid coupon data is verified.

4. The method of claim 1, wherein the purchaser is assigned a personal identification number (PIN), and including verifying identity of a person attempting to redeem the coupon data in response by processing the personal identification number.

5. The method of claim 1, wherein the purchaser prints the coupon data on secure stock, and including verifying the coupon data if printed on secure stock.

6. The method of claim 1, including storing, by the non-secure terminal, said redeemable data in a machine readable store.

7. The method of claim 1, including printing, by the non-secure terminal, said redeemable data on a human readable stock.

8. A method for automated issuance by a data processing system of a coupon redeemable for goods or services in a transaction involving a purchaser at a non-secure terminal on a public network, comprising:

receiving purchaser login data from the public network at a processing system, the login data identifying the purchaser;

providing through the public network to the identified purchaser at the non-secure terminal a gateway in the processing system to tools for selecting goods or services for purchase;

receiving payment information through the public network, from the purchaser for selected goods or services;

verifying payment; and generating and sending to the purchaser at the non-secure terminal coupon data through the public network including information sufficient to be redeemed for the selected goods or services, wherein the coupon data includes a clear text transcript of the transaction and an encrypted transcript of the transaction.

9. The method of claim 8, wherein the encrypted transcript includes data indicating the identified purchaser, the selected goods or services and verification of payment.

10. The method of claim 9, wherein the encrypted transcript includes data indicating when the transaction occurred.

11. A method for automated issuance in a data processing system of an airline ticket redeemable for travel in a transaction involving a purchaser at a non-secure terminal on a public network, comprising:

receiving purchaser login data from the public network at a processing system, the login data identifying the purchaser;

providing through the public network to the identified purchaser at the non-secure terminal a gateway in the processing system to tools for making airline reservations for purchase;

receiving payment information through the public network, from the purchaser for selected airline reservations;

verifying payment;

generating a clear text transcript of at least a portion of the transaction;

generating an encrypted transcript of at least a portion of the transaction sending the clear text transcript and the encrypted transcript to the purchaser at the non-secure terminal across the public network for use by the purchaser as an airline ticket.

12. The method of claim 11, including:
providing verification services to providers of the airline travel services by which valid tickets are verified.

13. The method of claim 11, including:
providing arbiter services to purchasers of the airline travel services by which valid tickets are verified.

14. The method of claim 11, wherein the purchaser is assigned a personal identification number (PIN), and including verifying the encrypted transcript in response to the personal identification number.

15. The method of claim 11, wherein the purchaser prints the encrypted text transcript on secure stock, and including verifying the encrypted text transcript if printed on secure stock.

16. The method of claim 11, wherein the encrypted transcript includes data indicating the identified purchaser, the reserved airline travel services and verification of payment.

17. The method of claim 16, wherein the encrypted transcript includes data indicating when the transaction occurred.

18. A method for automated issuance in a data processing system of a coupon redeemable for goods or services in a transaction involving a purchaser at a non-secure terminal on a public network, comprising:

receiving purchaser login data from the public network at a processing system, the login data identifying the purchaser;

opening a gateway for the purchaser at the non-secure terminal to a catalog system providing through the public network tools for selecting goods or services for purchase;

receiving reservation confirmation data from the catalog system and signaling the purchaser of a confirmed reservation for goods or services;

receiving payment information through the public network, from the purchaser for the confirmed reservation;

verifying payment;

generating a clear text transcript of at least a portion of the transaction;

generating an encrypted transcript of at least a portion of the transaction;

sending the clear text transcript and the encrypted transcript to the purchaser at the non-secure terminal across the public network for use as a coupon.

19. The method of claim 18, wherein the encrypted transcript includes data indicating the identified purchaser, the reserved goods or services and verification of payment.

20. The method of claim 18, wherein the encrypted transcript includes data indicating when the transaction occurred.

21. The method of claim 18, including:
providing verification services to providers of the goods or services by which valid coupons are verified.

22. The method of claim 18, including:
providing arbiter services to purchasers of the goods or services by which valid coupons are verified.

23. The method of claim 18, wherein the purchaser is assigned a personal identification number (PIN), and including verifying the coupon in response to the personal identification number.

24. The method of claim 18, wherein the purchaser prints the encrypted text transcript on secure stock, and including verifying the encrypted text transcript if printed on secure stock.

25. A method for automated issuance of a coupon redeemable for travel in a transaction involving a purchaser at a non-secure terminal on a public network, comprising:

receiving purchaser login data from the public network at a processing system, the login data identifying the purchaser;

opening a gateway for the purchaser at the non-secure terminal to an airline reservation system providing through the public network tools for making airline reservations for purchase;

receiving reservation confirmation data from the airline reservation system and signaling the purchaser of a confirmed reservation;

receiving payment information through the public network from the purchaser for the confirmed reservation;

verifying payment;

generating a clear text transcript of the transaction;

generating an encrypted transcript of the transaction, wherein the encrypted transcript includes data indicating the identified purchaser, the reserved airline travel services and verification of payment;

sending the clear text transcript and the encrypted transcript to the purchaser at the non-secure terminal across the public network for use as an airline ticket so that the airline ticket may be redeemed for the reserved airline travel services at a later date.

26. The method of claim 25, wherein the encrypted transcript includes data indicating when the transaction occurred.

27. The method of claim 25, including:
providing verification services to providers of the airline travel services by which valid tickets are verified.

28. The method of claim 25, including:
providing arbiter services to purchasers of the airline travel services by which valid tickets are verified.

29. The method of claim 25, wherein the purchaser is assigned a personal identification number (PIN), and including verifying the encrypted transcript in response to the personal identification number.

30. The method of claim 25, wherein the purchaser prints the encrypted text transcript on secure stock, and including verifying the encrypted text transcript if printed on secure stock.

* * * * *

UNITED STATES PATENT AND TRADEMARK OFFICE
CERTIFICATE OF CORRECTION

PATENT NO. : 5,884,277
DATED : March 16, 1999
INVENTOR(S) : Vinod Khosla

It is certified that error appears in the above-indentified patent and that said Letters Patent is hereby corrected as shown below:

In Col. 6, line 2 (Claim 1):

After "terminal", delete "a gateway" and insert therefor --access to tools--.

In Col. 6, line 3 (Claim 1):

After "system", delete "to tools".

In Col. 6, line 42 (Claim 8):

After "terminal", delete "a gateway" and insert therefor --access to tools--.

In Col. 6, line 43 (Claim 8):

After "system", delete "to tools".

In Col. 7, line 2 (Claim 11):

After "terminal" delete "a gateway" and insert therefor --access to tools--.

UNITED STATES PATENT AND TRADEMARK OFFICE
CERTIFICATE OF CORRECTION

PATENT NO. : 5,884,277
DATED : March 16, 1999
INVENTOR(S) : Vinod Khosla

It is certified that error appears in the above-indentified patent and that said Letters Patent is hereby corrected as shown below:

In Col. 7, line 3 (Claim 11):

After "system", delete "to tools".

Signed and Sealed this

Twelfth Day of October, 1999

Attest:

Q. TODD DICKINSON

Attesting Officer      Acting Commissioner of Patents and Trademarks